US011853555B2

(12) United States Patent
Benisty

(10) Patent No.: US 11,853,555 B2
(45) Date of Patent: Dec. 26, 2023

(54) NVME DUAL PORT ENTERPRISE SSD OPTIMIZATION

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 68 days.

(21) Appl. No.: 17/450,525

(22) Filed: Oct. 11, 2021

(65) Prior Publication Data
US 2023/0116254 A1    Apr. 13, 2023

(51) Int. Cl.
*G06F 3/06* (2006.01)

(52) U.S. Cl.
CPC .......... *G06F 3/0613* (2013.01); *G06F 3/0634* (2013.01); *G06F 3/0659* (2013.01); *G06F 3/0679* (2013.01)

(58) Field of Classification Search
CPC .... G06F 3/0613; G06F 3/0634; G06F 3/0659; G06F 3/0679
See application file for complete search history.

(56) References Cited

U.S. PATENT DOCUMENTS

| | | | |
|---|---|---|---|
| 9,003,071 B2 * | 4/2015 | Liu | G06F 9/50 710/9 |
| 10,649,815 B2 | 5/2020 | Ding et al. | |
| 10,769,042 B2 | 9/2020 | Swamy | |
| 10,824,574 B2 | 11/2020 | Marks et al. | |
| 10,866,923 B2 | 12/2020 | Long et al. | |
| 2016/0266934 A1 * | 9/2016 | Rimoni | G06F 9/5038 |
| 2018/0074757 A1 * | 3/2018 | Yamaguchi | G06F 3/0659 |
| 2018/0260347 A1 * | 9/2018 | Benisty | G06F 3/0688 |
| 2019/0042148 A1 | 2/2019 | Benisty et al. | |

(Continued)

FOREIGN PATENT DOCUMENTS

CN      113114595 A      7/2021

OTHER PUBLICATIONS

International Search Report and Written Opinion for International Application No. PCT/US2022/028420 dated Oct. 18, 2022.

(Continued)

*Primary Examiner* — Kalpit Parikh
(74) *Attorney, Agent, or Firm* — PATTERSON + SHERIDAN, LLP; Steven H. VerSteeg

(57) ABSTRACT

The present disclosure generally relates to a non-volatile memory express (NVMe) dual port controller occupying less real estate on an application specific integrated circuit (ASIC). Rather than utilizing separate NVMe modules in the controller, with each module dedicated to a single port, the dual ports can share the same module. The host device believes that there are dedicated module resources because the module has two NVMe registers to provide the host device with the feeling that there are dedicated modules. Additionally, an interconnect between the ports and the registers contributes to providing the host device the feeling that there are dedicated modules. Furthermore, the rather than losing the capabilities of a second module when operating in single port mode, all of the capabilities of the only module are available when operating in either single port mode or dual port mode.

20 Claims, 5 Drawing Sheets

(56) References Cited

U.S. PATENT DOCUMENTS

| | | |
|---|---|---|
| 2019/0280411 A1* | 9/2019 | Olarig .................. G06F 3/0634 |
| 2020/0183864 A1 | 6/2020 | Zhou et al. |
| 2020/0371986 A1 | 11/2020 | Olarig |
| 2021/0209036 A1 | 7/2021 | Govindarajan et al. |

OTHER PUBLICATIONS

"White Paper—Multi-Host Sharing of NVMe Drives and GPUs Using PICe Fabrics," ESC-2190732 White Paper Revision 2.0, Preliminary, Oct. 2019, Microsemi, a Microchip Company, 18 pages, <https://www.microsemi.com/document-portal/doc_download/1244483-multi-host-sharing-of-nvme-drives-and-gpus-using-pcie>.

* cited by examiner

NVME DUAL PORT ENTERPRISE SSD OPTIMIZATION

BACKGROUND OF THE DISCLOSURE

Field of the Disclosure

Embodiments of the present disclosure generally relate to a non-volatile memory express (NVMe) dual port controller occupying less real estate on an application specific integrated circuit (ASIC).

Description of the Related Art

Enterprise solid state devices (SSDs) support NVMe dual port features as defined in the NVMe standard and the peripheral component interconnect express (PCIe) standard. Traditionally, single x4 devices are split into two x2 devices via port A and port B. The methods to access the device are either port A as a single port, port B as a single port, or both ports simultaneously as a dual port system. The dual ports provide the ability to connect two host devices simultaneously to a data storage device.

The data storage device can be connected directly to a host device central processing unit (CPU) or via PCIe switch topology if a higher SSD count is necessary. The concept is the same as SAS Enterprise Storage HA designs, but implemented with a PCIe bus.

Dual port NVMe extensions were added to the original specification with NVMe 1.1 revision. The eco-system is new and very focused on addressing specific problems. The problems are common for Enterprise Storage (Scale Up Storage) and some other areas such as HPC storage. Unfortunately, to support an NVMe dual port feature, the controller utilizes a lot of ASIC real estate, which increases costs.

Therefore, there is a need in the art for a dual port NVMe controller that utilizes less real estate on an ASIC while also reducing costs.

SUMMARY OF THE DISCLOSURE

The present disclosure generally relates to a non-volatile memory express (NVMe) dual port controller occupying less real estate on an application specific integrated circuit (ASIC). Rather than utilizing separate NVMe modules in the controller, with each module dedicated to a single port, the dual ports can share the same module. The host device believes that there are dedicated module resources because the module has two NVMe registers to provide the host device with the feeling that there are dedicated modules. Additionally, an interconnect between the ports and the registers contributes to providing the host device the feeling that there are dedicated modules. Furthermore, the rather than losing the capabilities of a second module when operating in single port mode, all of the capabilities of the only module are available when operating in either single port mode or dual port mode.

In one embodiment, a data storage device comprises: a memory device; and a controller coupled to the memory device, wherein the controller comprises: at least one physical layer (phy); a peripheral component interconnect express (PCIe) endpoint; a non-volatile memory express (NVMe) module; and an interconnect coupled between the PCIe endpoint and the NVMe module.

In another embodiment, a data storage device comprises: a memory device; and a controller coupled to the memory device, wherein the controller comprises: at least two peripheral component interconnect express (PCIe) endpoints; and at least one non-volatile memory express (NVMe) module, wherein a number of NVMe modules is less than a number of PCIe endpoints.

In another embodiment, a data storage device comprises: memory means; and a controller coupled to the memory means, wherein the controller comprises: at least two peripheral component interconnect express (PCIe) endpoints; and a non-volatile memory express (NVMe) module comprising: at least two NVMe registers, wherein a number of NVMe registers is equal to a number of PCIe endpoints; and a command parser, wherein a number of command parsers is less than the number of PCIe endpoints.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a non-volatile memory express (NVMe) dual port controller occupying less real estate on an application specific integrated circuit (ASIC). Rather than utilizing separate NVMe modules in the controller, with each module dedicated to a single port, the dual ports can share the same module. The host device believes that there are dedicated module resources because the module has two NVMe registers to provide the host device with the feeling that there are dedicated modules. Additionally, an interconnect between the ports and the registers contributes to providing the host device the feeling that there are dedicated modules. Furthermore, the rather than losing the capabilities of a second module when operating in single port mode, all of the capabilities of the only module are available when operating in either single port mode or dual port mode.

Figure 1:
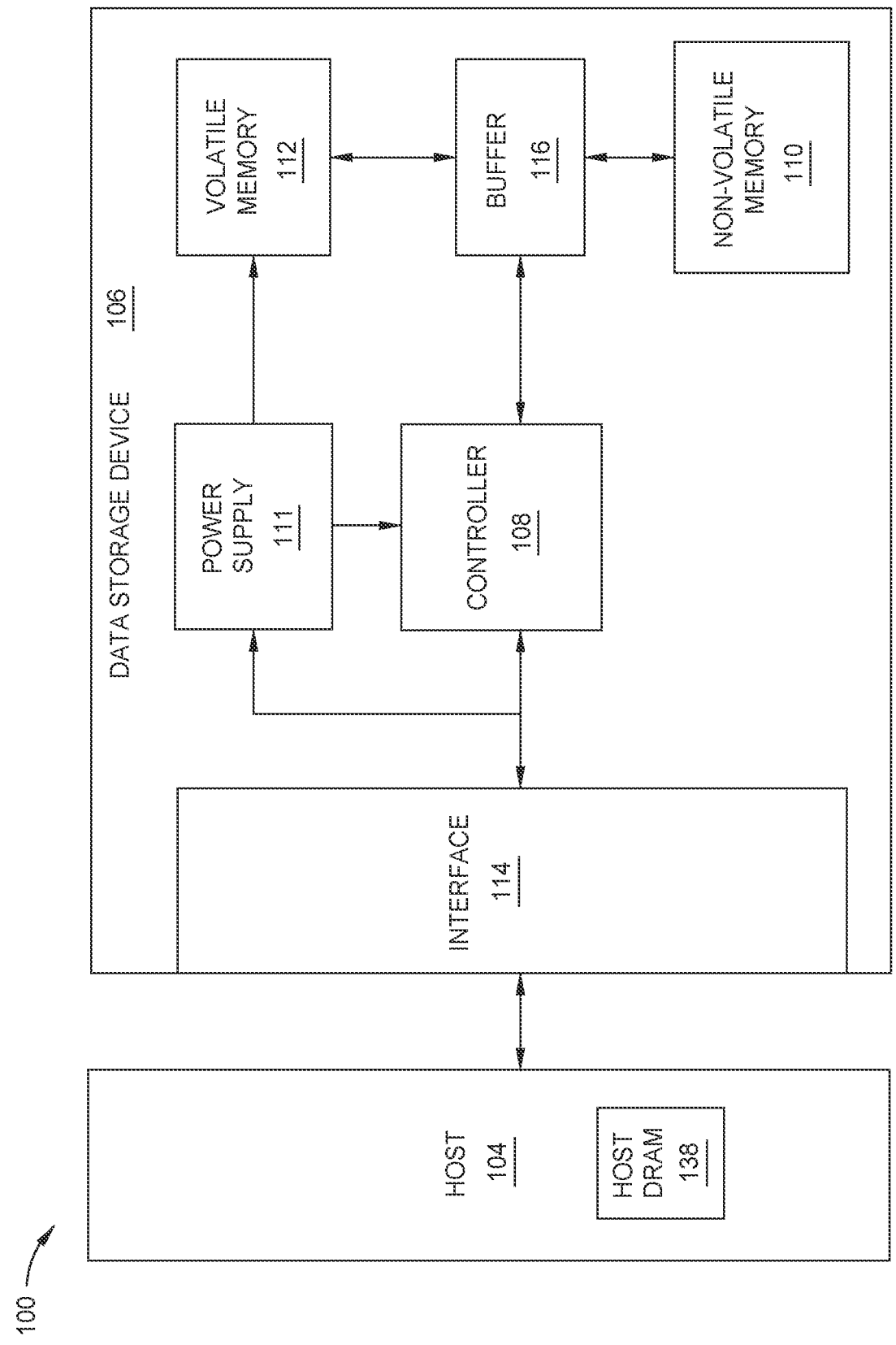
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
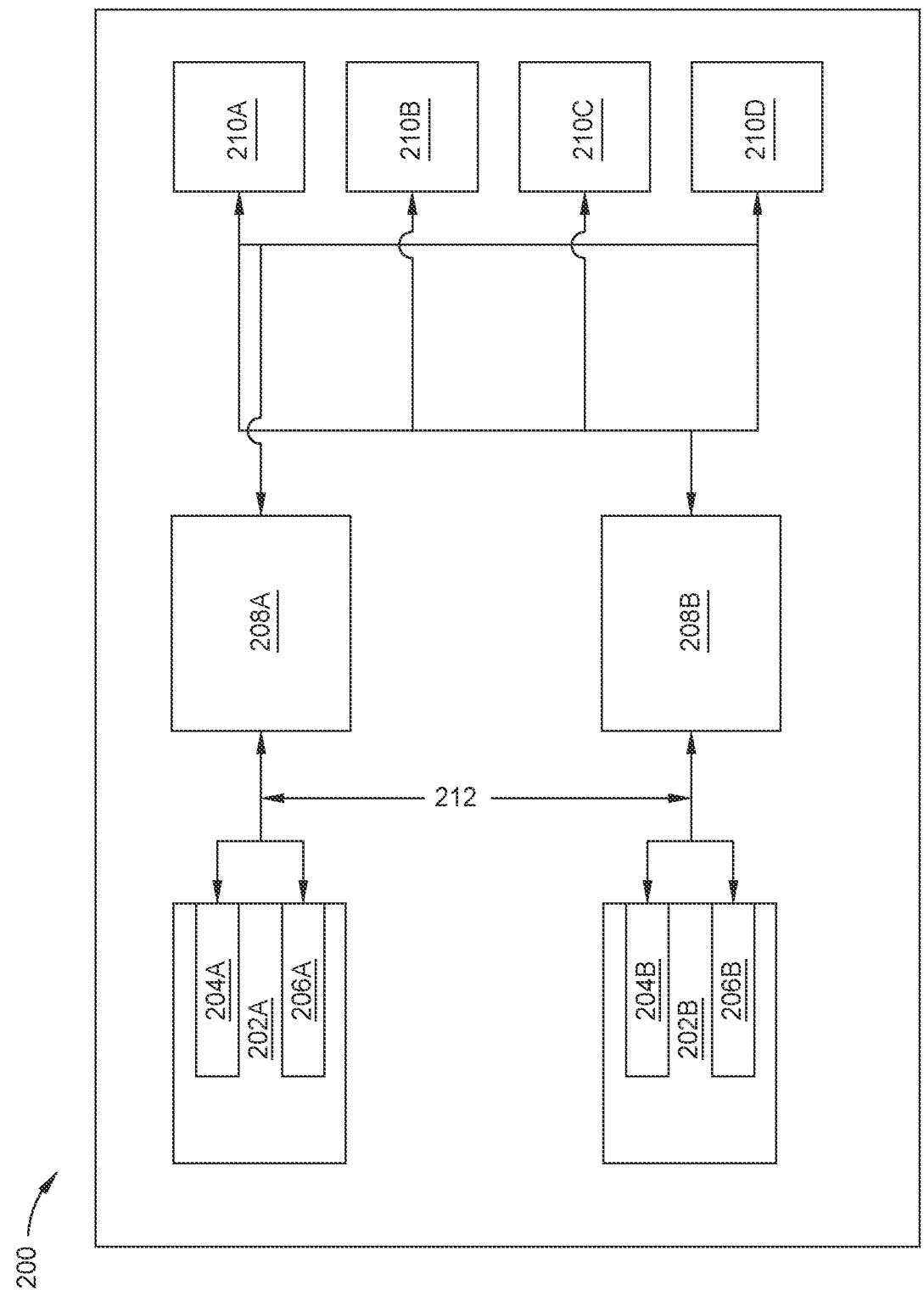
FIG. 2 is a schematic illustration of a dual port storage controller system.

FIG. 2 is a schematic illustration of a dual port storage controller system 200. The system 200 includes two servers 202A, 202B, with each server 202A, 202B having a first host bus adapter (HBA) 204A, 204B and a second HBA 206A, 206B. The system 200 also includes two switches 208A, 208B as well as a plurality of data storage devices 210A-210D. Each data storage device 210A-210D is connected to both switches 208A, 208B. One switch 208A is connected to both the first HBA 204A and the second HBA 206A of the first server 202A. A second switch 208B is connected to both the first HBA 204B and the second HBA 206B of the second server 202B. Furthermore, the connection between the first switch 208A and the second HBA 206A of the first server 202A is connected to the connection between the second switch 208A and the first HBA 204B of the second server 202B as shown by line 212. In the system 200, each data storage device 210A-210D has two ports such that the data storage devices 210A-210D are coupled to two distinct switches 208A, 208B, where the switches 208A, 208B and servers 202A, 202B collectively represent a host device. The system 200 illustrates that two hosts, can be connected to a single data storage device. Furthermore, system 200 illustrates that an individual host device can share at least one, and in some cases multiple, data storage device(s) with at least one other host device.

Figure 3:
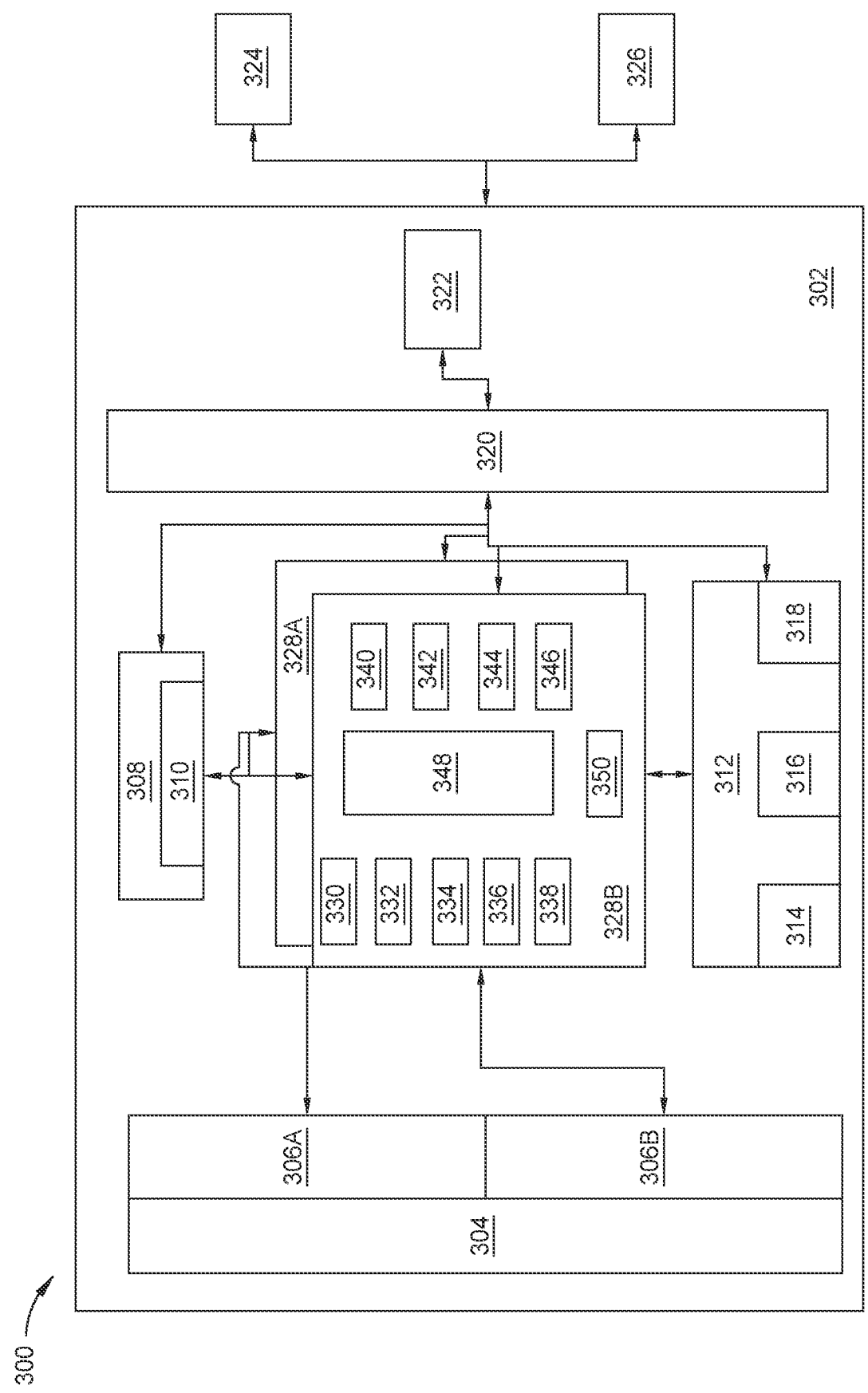
FIG. 3 is a schematic illustration of a data storage device having a dual port storage controller having two NVMe modules.

FIG. 3 is a schematic illustration of a data storage device 300 having a dual port storage controller having two NVMe modules. In order to support the dual ports feature, two PCIe endpoints 306A, 306B and two NVMe modules 328A, 328B are necessary. In single port mode, only one NVMe module 328A, 328B and one PCIe endpoint 306A, 306B are used while the remaining NVMe module 328A, 328B and PCIe endpoint 306A, 306B are idle. In dual port mode, both PCIe endpoints 306A, 306B and both NVMe modules 328A, 328B are utilized.

The data storage device 300 includes a controller 302 having a physical layer (phy) 304, such as a PCIe phy that can be configured as a 1×4 or a 2×2 phy. The controller 302 is coupled to a non-volatile memory (NVM) device 324 and a volatile memory device 326. The controller 302 also includes back end modules 322, a front end processor 308, and a front end accelerator 312. The front end processor 308 includes hardware queues 310, while the front end accelerator 312 includes security modules 314, a scheduler 316, and a command accelerator 318.

The controller 302 additionally includes two NVMe modules 328A, 328B, one for each PCIe endpoint 306A, 306B. Each NVMe module 328A, 328B is connected to the front end accelerator 312 and the front end processor 308. Furthermore, each NVMe module 328A, 328B is coupled to an interconnect 320 that couples the NVMe modules 328A, 328B to the back end modules 322. Hence, the interconnect 320 is coupled to both the NVMe modules 328A, 328B and the back end modules 322. In regards to the PCIe endpoints 306A, 306B, each PCIe endpoint 306A, 306B is coupled to a separate and distinct NVMe module 328A, 328B. In FIG. 3, PCIe endpoint 306A is coupled to NVMe module 328A, but not NVMe module 328B. Similarly, PCIe endpoint 306B is coupled to NVMe module 328B and not NVMe module 328A.

Each NVMe module 328A, 328B has numerous components and logic. The components and logic are identical for each NVMe module 328A, 328B. Hence, each NVMe module 328A, 328B is identical to the other NVMe module 328A, 328B in all aspects except for which PCIe endpoint 306A, 306B is coupled thereto. Each NVMe module 328A, 328B includes a subqueue 330, a command parser 332, a buffer pointer manager 334, a command fetcher 336, a completion queue 338, a read queue 340, a high priority write queue 342, a low priority write queue 344, a command queue 346, a host interface module (HIM) sequencer 348, and a NVMe register 350. Each NVMe module 328A, 328B utilizes real estate of the application specific integrated circuit (ASIC) upon which the NVMe module 328A, 328B is attached, which leads to cost increases. Furthermore, each NVMe module 328A, 328B has a capability for use. When operating in single port mode, only one NVMe module 328A, 328B is utilized and hence, the capability of the other NVMe module 328A, 328B is wasted.

For example, each NVMe module 328A, 328B is capable of performing 64 virtual functions, has 256 MSI-X tables, handles 512 outstanding commands, handles 16 outstanding administrative commands, and has 256 queue pairs. Since each NVMe module 328A, 328B has such capabilities, when the device operates in dual port mode, the device is capable of performing 128 virtual functions (64 for each port), has 512 MSI-X tables (256 for each port), handles 1024 outstanding commands (512 for each port), handles 32 outstanding administrative commands (16 for each port), and has 512 queue pairs (256 for each port). Thus, when operating in single port mode, the device is only capable of 64 virtual functions, 256 MSI-X tables, 512 outstanding commands, 16 outstanding administrative commands, and 256 queue pairs, which means the device has wasted 64 virtual functions, 256 MSI-X tables, 512 outstanding commands, 16 outstanding administrative commands, and 256 queue pairs due to the inactivity of the other port and hence, the inactivity of the other NVMe module 328A, 328B.

Figure 4:
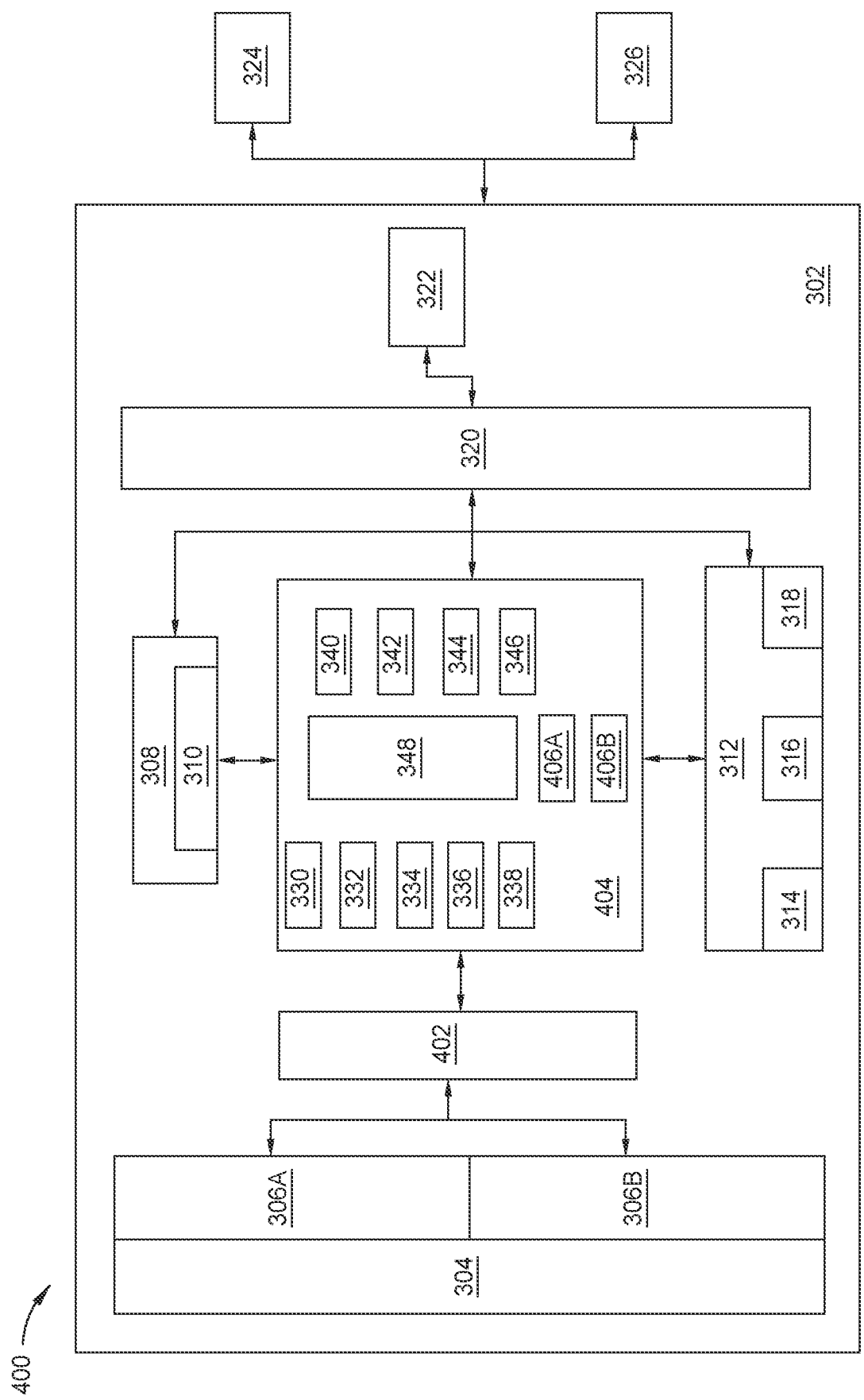
FIG. 4 is a schematic illustration of a data storage device having a dual port storage controller having one NVMe module.

FIG. 4 is a schematic illustration of a data storage device 400 having a dual port storage controller 302 having one NVMe module 404. Rather than duplicating the entire NVMe module 328A, 328B and all related databases as shown in FIG. 3, only a single NVMe module 404 is present. The NVMe module 404 includes two NVMe registers 406A, 406B, one for each port. Only the NVMe registers 406A, 406B are visible to the host device. Hence, the host device feels that there is a dedicated NVMe module for each port while in reality, there is only one NVMe module 404 and two NVMe registers 406A, 406B. All of the capabilities of the NVMe module 404 are shared by the NVMe registers 406A, 406B. Hence, regardless of whether the device is operating in single port mode or in dual port mode, the NVMe module is capable of performing 128 virtual functions, has 512 MSI-X tables, handles 1024 outstanding commands, handles 32 outstanding administrative commands, and has 512 queue pairs. Stated another way, NVMe module 404, when operating in single port mode, is capable of twice the capacity of either NVMe module 328A or 328B operating in single port mode. Resources that were on a different and distinct NVMe module 328A, 328B could not be previously used. However, as shown in FIG. 4, those resources are available at all times regardless of whether operating in single port mode or dual port mode. Furthermore, because only one NVMe module 404 is present, along with two NVMe registers 406A, 406B, less real estate is used on the ASIC as compared with the device in FIG. 3.

In addition to utilizing only one NVMe module 404 with two NVMe registers 406A, 406B, an interconnect 402 is coupled between the NVMe module 404 and the PCIe endpoints 306A, 306B such that the interconnect 402 is coupled to the NVMe module 404 and both PCIe endpoints 306A, 306B. The interconnect 402 functions to transfer the transactions between the PCIe endpoints 306A, 306B and the NVMe registers 406A, 406B correctly. Table I shows the transfer of transactions when operating in single port mode while Table II shows the transfer of transactions when operating in dual port mode.

TABLE I

|  | EP0 slave | EP1 slave | NVMe reg0 | NVMe reg1 |
|---|---|---|---|---|
| EP0 master | Invalid | Invalid | Access | No Access |
| EP1 master | Invalid | Invalid | No Access | No Access |
| NVMe master | Access | No Access | Invalid | Invalid |

TABLE II

|  | EP0 slave | EP1 slave | NVMe reg0 | NVMe reg1 |
|---|---|---|---|---|
| EP0 master | Invalid | Invalid | Access | No Access |
| EP1 master | Invalid | Invalid | No Access | Access |
| NVMe master | Access | Access | Invalid | Invalid |

In single port mode, only one PCIe endpoint 306A, 306B is in operation. Hence, in single port mode, EP1 (i.e., endpoint 1) master does not operate and hence, EP0 (i.e., endpoint 0) slave and EP1 slave are invalid while NVMe reg0 (i.e., NVMe register 0) and NVMe reg1 (i.e., NVMe register 1) have no access. Conversely, EP0 master will operate such that EP0 slave and EP1 slave are invalid, NVMe reg0 has access, and NVMe reg1 has no access. Similarly, in single port most, only one NVMe register 406A, 406B is in operation and hence, EP1 slave does not operate and thus EP0 master and EP1 master are invalid while NVMe master has no access. In regards to the NVMe registers, NVMe reg1 does not operate and hence, EP0 and EP1 will have no access while NVMe master will be invalid. NVMe reg0 will operate and hence, EP0 will have access, EP1 will have no access, and NVMe master will be invalid. NVMe master will have access to EP0 slave, no access to EP1 slave, and be invalid for NVMe reg0 and NVMe reg1.

In dual port mode, both NVMe registers 406A, 406B operate as do both PCIe endpoints 306A, 306B. Thus, EP0 master will be invalid for EP0 slave and EP1 slave while having access to NVMe reg0 and no access to NVMe reg1. EP1 master will be invalid for EP0 slave and EP1 slave while having no access to NVMe reg0 and access to NVMe reg1. NVMe master will have access to both EP0 slave and EP1 slave while being invalid for NVMe reg0 and NVMe reg1. NVMe master indicates the per transaction destination link to the interconnect 402 and based on that the interconnect 402 transfers the destination link to the relevant PCIe endpoint 306A, 306B.

In one embodiment, the extra NVMe register (or registers if more than 2 are present) may be used for other proposals for volatile storage (e.g., increasing RAM size of the device for L2P tables, XOR bins, or data buffers).

Thus, instead of duplicating the entire NVMe module 328A, 328B and all related databases, only a single NVMe module 404 is utilized with only the NVMe registers 406A, 406B being duplicated and visible to the host device. Such an arrangement will provide the host device with the feeling that the host device is treated with a dedicated NVMe device while internally the entire logic is actually shared.

Figure 5:
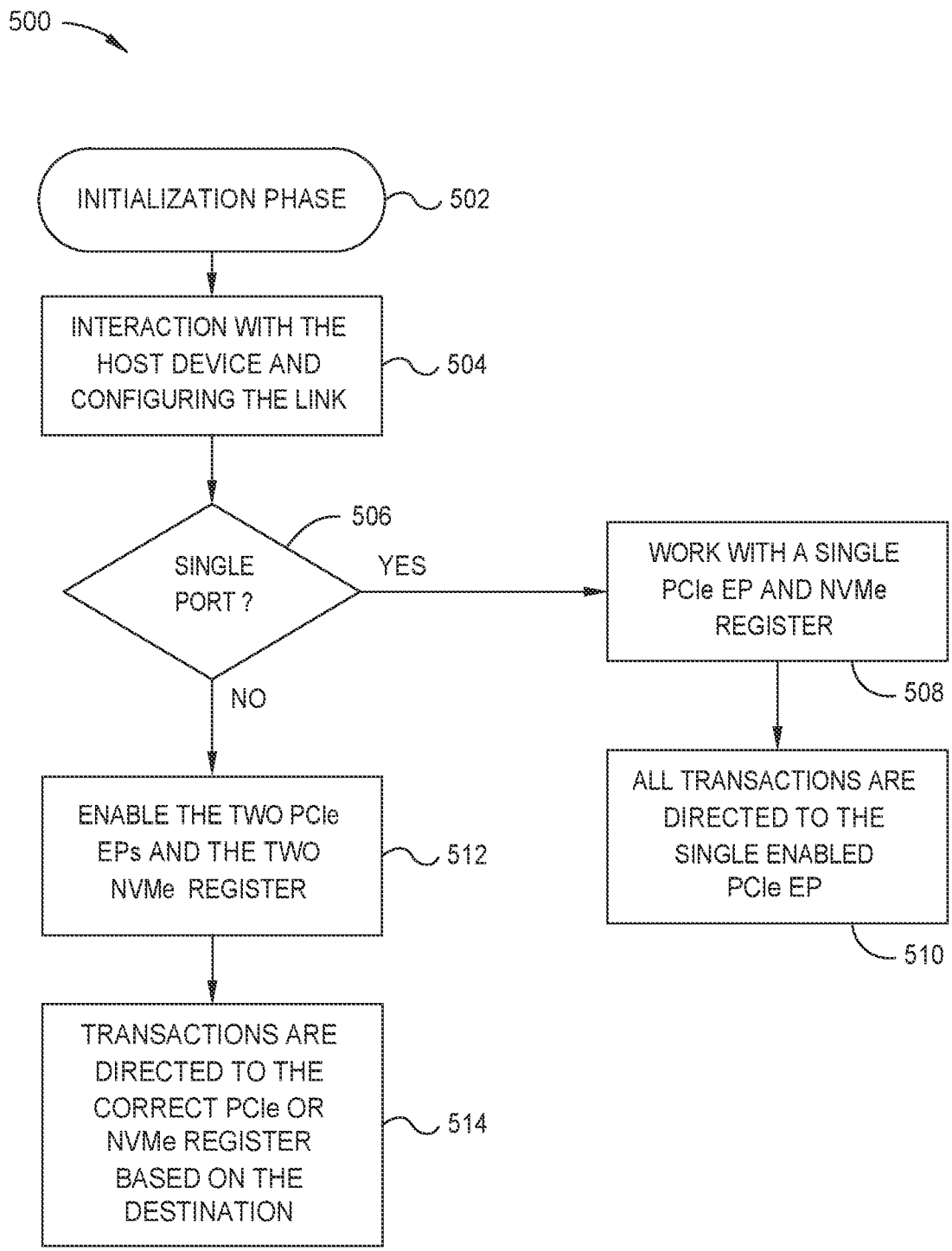
FIG. 5 is a flowchart illustrating an algorithm for operating a dual port storage controller having one NVMe module.

FIG. 5 is a flowchart 500 illustrating an algorithm for operating a dual port storage controller having one NVMe module 404. At 502, the initialization phase occurs. Then, the host device and the data storage device interact with each other and determine the link configuration and configure the link at 504. If a single port is configured as determined at 506, then only a single PCIe endpoint 306A or 306B and a single NVMe register 406A or 406B will be enabled at 508 while the other logic (i.e., other PCIe endpoint and other NVMe register) is disabled. All transactions will then be directed to the single enabled PCIe endpoint 306A or 306B at 510. The interconnect 402 just passes through all transactions between PCIe endpoint EP0 (i.e., 306A or 306B) and NVMe register (i.e., 406A or 406B) and vice versa. If a single port is not configured at 506, then dual port mode is configured. Both PCIe endpoints 306A, 306B and both NVMe registers 406A, 406B are enabled at 512 and the transactions are directed to the correct destination by the interconnect 402 as described above at 514.

By utilizing a single NVMe module that has two NVMe registers, along with an interconnect between the dual ports and the module, a host device will have the feeling that there are dedicated modules for each port even though a single module is present. Further, because only a single module is utilized, less real estate of the ASIC is needed, and all resources of the module are available for use regardless of whether the controller is operating in dual port mode or single port mode.

It is to be understood that it is contemplated that more than two ports may be utilized. In a scenario where more than two ports are utilized, there will be more than two PCIe endpoints, and more than two NVMe registers with the number of PCIe endpoints being equal to the number of NVMe registers. However, regardless of how many ports are present, it is envisioned that only one NVMe module would be present, as well as only one interconnect between the PCIe endpoints and the NVMe module.

In one embodiment, a data storage device comprises: a memory device; and a controller coupled to the memory device, wherein the controller comprises: at least one physical layer (phy); a peripheral component interconnect express (PCIe) endpoint; a non-volatile memory express (NVMe) module; and an interconnect coupled between the PCIe endpoint and the NVMe module. The data storage device is configured to operate in either single port or dual port mode. A number of virtual functions that can be performed in single port mode is equal to a number of virtual functions that can be performed in dual port mode. A number of outstanding input/output (I/O) commands that can be processed simultaneously in single port mode is equal to a number of I/O commands that can be processed simultaneously in dual port mode. A number of administrative commands that can be processed simultaneously in single port mode is equal to a number of administrative commands that can be processed simultaneously in dual port mode. A number of queue pairs in single port mode is equal to a number of queue pairs in dual port mode. The controller is configured to interact with a host device and configure a link with the host device as either a single port or a dual port. The controller is configured to enable two PCIe endpoints and two NVMe registers when operating in dual mode. The controller is further configured to direct transactions to a correct PCIe endpoint. The controller is further configured to direct transactions to a correct NVMe register.

In another embodiment, a data storage device comprises: a memory device; and a controller coupled to the memory device, wherein the controller comprises: at least two peripheral component interconnect express (PCIe) endpoints; and at least one non-volatile memory express (NVMe) module, wherein a number of NVMe modules is less than a number of PCIe endpoints. The controller is configured to determine whether a host device will be a single port configuration or a dual port configuration. The controller is configured to work with a single PCIe endpoint and NVMe register of the NVMe module. The controller is configured to enable two PCIe endpoints and wherein the controller is configured to enable two NVMe registers of a single NVMe module. The controller is configured to direct transactions to a correct PCIe endpoint or an NVMe register through an interconnect disposed therebetween.

In another embodiment, a data storage device comprises: memory means; and a controller coupled to the memory means, wherein the controller comprises: at least two peripheral component interconnect express (PCIe) endpoints; and a non-volatile memory express (NVMe) module comprising: at least two NVMe registers, wherein a number of NVMe registers is equal to a number of PCIe endpoints; and a command parser, wherein a number of command parsers is less than the number of PCIe endpoints. A number of NVMe registers is equal to a number of PCIe endpoints. A number of NVMe modules is less than a number of PCIe endpoints. The data storage device further comprises an interconnect coupled between the at least two PCIe endpoints and the NVMe module. During operation of single port mode, all logic containing in the NVMe module is available for use by a single PCIe endpoint, and wherein only one NVMe register is in operation in single port mode.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a memory device; and
 a controller coupled to the memory device, wherein the controller comprises:
  at least one physical layer (phy);
  a peripheral component interconnect express (PCIe) endpoint;
  a non-volatile memory express (NVMe) module, wherein the NVMe module comprises:
   a subqueue;
   a command parser;
   a buffer pointer manager;
   a command fetcher;
   a completion queue;
   a read queue;
   a high priority write queue;
   a low priority write queue;
   a command queue; and
   a host interface module (HIM), wherein the controller is configured to enable a single PCIe endpoint and a single NVMe register while disabling other logic, wherein the other logic is both other PCIe endpoints and other NVMe registers, wherein the controller is further configured to direct a plurality of transactions to the enabled single PCIe endpoint, wherein the controller is further configured to pass the plurality of transactions through the single PCIe endpoint and the single NVMe register; and
  an interconnect coupled between the PCIe endpoint and the NVMe module.

2. The data storage device of claim 1, wherein the data storage device is configured to operate in either single port or dual port mode.

3. The data storage device of claim 2, wherein a number of virtual functions that can be performed in single port mode is equal to a number of virtual functions that can be performed in dual port mode.

4. The data storage device of claim 2, wherein a number of outstanding input/output (I/O) commands that can be processed simultaneously in single port mode is equal to a number of I/O commands that can be processed simultaneously in dual port mode.

5. The data storage device of claim 2, wherein a number of administrative commands that can be processed simultaneously in single port mode is equal to a number of administrative commands that can be processed simultaneously in dual port mode.

6. The data storage device of claim 2, wherein a number of queue pairs in single port mode is equal to a number of queue pairs in dual port mode.

7. The data storage device of claim 1, wherein the controller is configured to interact with a host device and configure a link with the host device as either a single port or a dual port.

8. The data storage device of claim 1, wherein the controller is configured to enable two PCIe endpoints and two NVMe registers when operating in dual mode.

9. The data storage device of claim 8, wherein the controller is further configured to direct transactions to a correct PCIe endpoint.

10. The data storage device of claim 9, wherein the controller is further configured to direct transactions to a correct NVMe register.

11. A data storage device, comprising:
a memory device; and
a controller coupled to the memory device, wherein the controller comprises:
   at least two peripheral component interconnect express (PCIe) endpoints; and
   at least one non-volatile memory express (NVMe) module, wherein a number of NVMe modules is less than a number of PCIe endpoints, wherein the at least one NVMe module comprises:
      a subqueue;
      a command parser;
      a buffer pointer manager;
      a command fetcher;
      a completion queue;
      a read queue;
      a high priority write queue;
      a low priority write queue;
      a command queue; and
      a host interface module (HIM), wherein the controller is configured to enable a single PCIe endpoint and a single NVMe register while disabling other logic, wherein the other logic is both other PCIe endpoints and other NVMe registers, wherein the controller is further configured to direct a plurality of transactions to the enabled single PCIe endpoint, wherein the controller is further configured to pass the plurality of transactions through the single PCIe endpoint and the single NVMe register.

12. The data storage device of claim 11, wherein the controller is configured to determine whether a host device will be a single port configuration or a dual port configuration.

13. The data storage device of claim 11, wherein the controller is configured to work with a single PCIe endpoint and NVMe register of the NVMe module.

14. The data storage device of claim 11, wherein the controller is configured to enable two PCIe endpoints and wherein the controller is configured to enable two NVMe registers of a single NVMe module.

15. The data storage device of claim 11, wherein the controller is configured to direct transactions to a correct PCIe endpoint or an NVMe register through an interconnect disposed therebetween.

16. A data storage device, comprising:
memory means; and
a controller coupled to the memory means, wherein the controller comprises:
   at least two peripheral component interconnect express (PCIe) endpoints; and
   a non-volatile memory express (NVMe) module comprising:
      at least two NVMe registers, wherein a number of NVMe registers is equal to a number of PCIe endpoints;
      a command parser, wherein a number of command parsers is less than the number of PCIe endpoints,
      a subqueue;
      a buffer pointer manager;
      a command fetcher;
      a completion queue;
      a read queue;
      a high priority write queue;
      a low priority write queue;
      a command queue; and
      a host interface module (HIM), wherein the controller is configured to enable a single PCIe endpoint and a single NVMe register while disabling other logic, wherein the other logic is both other PCIe endpoints and other NVMe registers, wherein the controller is further configured to direct a plurality of transactions to the enabled single PCIe endpoint, wherein the controller is further configured to pass the plurality of transactions through the single PCIe endpoint and the single NVMe register.

17. The data storage device of claim 16, wherein a number of NVMe registers is equal to a number of PCIe endpoints.

18. The data storage device of claim 16, wherein a number of NVMe modules is less than a number of PCIe endpoints.

19. The data storage device of claim 16, further comprising an interconnect coupled between the at least two PCIe endpoints and the NVMe module.

20. The data storage device of claim 16, wherein during operation of single port mode, all logic containing in the NVMe module is available for use by a single PCIe endpoint, and wherein only one NVMe register is in operation in single port mode.

* * * * *